United States Patent [19]

Kumar

[11] 4,178,394

[45] Dec. 11, 1979

[54] PROCESS FOR PRODUCING SAUSAGE ANALOGS

[75] Inventor: Surinder Kumar, Buffalo Grove, Ill.

[73] Assignee: The Quaker Oats Company, Chicago, Ill.

[21] Appl. No.: 832,535

[22] Filed: Sep. 12, 1977

[51] Int. Cl.² .............................................. A23J 3/00
[52] U.S. Cl. .................................... 426/656; 426/657; 426/802; 426/104
[58] Field of Search ............... 426/104, 656, 657, 802, 426/573, 574

[56] References Cited

U.S. PATENT DOCUMENTS

| | | | |
|---|---|---|---|
| 2,802,737 | 8/1957 | Anson et al. | 426/802 X |
| 3,645,747 | 2/1972 | Palmer | 426/802 X |
| 3,711,291 | 1/1973 | Leidy et al. | 426/657 X |
| 3,719,499 | 3/1973 | Hai et al. | 426/802 X |
| 3,836,678 | 9/1974 | Leidy et al. | 426/104 X |
| 3,886,299 | 5/1975 | Feldbrugge et al. | 426/802 X |
| 3,900,576 | 8/1975 | Schulz | 426/656 X |
| 3,919,435 | 11/1975 | Feldbrugge et al. | 426/802 X |
| 3,922,352 | 11/1975 | Tewey et al. | 426/574 X |
| 3,930,033 | 12/1975 | Corliss et al. | 426/802 X |

FOREIGN PATENT DOCUMENTS

| | | | |
|---|---|---|---|
| 45-26054 | 8/1970 | Japan | 426/656 |
| 48-8506 | 3/1973 | Japan | 426/656 |

*Primary Examiner*—Raymond N. Jones
*Assistant Examiner*—Esther M. Kepplinger
*Attorney, Agent, or Firm*—Charles J. Hunter

[57] ABSTRACT

A simulated sausage product is produced by forming and combining individual phases that are responsible for chewiness, biting properties, juiciness, mouth lubrication, cohesion and frying properties. The individual phases are produced from separate mixtures containing critical amounts of egg white, non-fat dry milk, sodium caseinate, dextrose, fat, fibrous material, water, texturized protein, salt, wheat gluten, colorings, flavors and seasonings.

11 Claims, No Drawings

PROCESS FOR PRODUCING SAUSAGE ANALOGS

BACKGROUND OF THE INVENTION

1. Field of the Invention

This invention relates to a sausage analog that resembles the natural product in appearance, cooking characteristics, flavor, eating qualities, and texture. The present invention further relates to a process for preparing a simulated sausage product.

2. Description of the Prior Art

A majority of the world's population like the taste of meat and associates meat products with high nutrition. However, the rapidly increasing population of the world has adversely affected the per capita supply of meat products. The increasing demand of a finite supply of meat products is inflating the cost of meat beyond the affordable range of a majority of people. On the other hand, affluent countries, where a large portion of the diet consists of meat products, are suffering from increased incidence of coronary artery disease. Although the relationship between diet and arteriosclerosis is not completely clear, many scientists believe that high intakes of saturated fats and cholesterol from meat is a major contributing cause. Therefore, people in affluent countries as well as those in underdeveloped countries may have to depend upon foods from non-animal sources fabricated to suit already developed taste for meat.

The preparation of meat-like food products from other protein sources has long been an aim of the food industry. For the past several years, food scientists have been attempting to develop meat analogs that resemble natural meats in appearance, texture, eating qualities, flavor and color. Extensive deviations in technique and formulation are necessary depending upon the meat product to be simulated.

One technique for producing meat analog products is the fiber spinning technique. The fiber spinning technique is an adaptation of the spun fiber method of making synthetic fibers utilized in the textile industry. In this method, a viscous protein solution is prepared which is extruded through spinnerettes into an acid-coagulating bath which causes precipitation into a filament form. These filaments are assembled into a meat-like product by the incorporation of binding materials. Boyer, U.S. Pat. No. 2,682,466 patented June 29, 1954 is considered the forerunner in this technique. However, since that time numerous patents have been issued employing spinnerettes, including Westeen et al. U.S. Pat. No. 3,118,959; Kuramoto et al. U.S. Pat. No. 3,177,079; Dechaine, U.S. Pat. No. 3,269,841; Page et al., U.S. Pat. No. 3,403,027; and Boyer et al., U.S. Pat. No. 3,468,669.

Another series of patents have been issued in the formation of a "chewy protein gel" by using various techniques to form meat-like products. The patentees, Anson and Pader, holders of U.S. Patents including U.S. Pat. Nos. 2,802,737; 2,813,024; 2,813,025; 2,830,902 and 2,833,651 have taught forming a solution of protein (soy or peanut concentrates) which is then precipitated under agitation at elevated temperature by lowering the pH of the solution to about 6.0. The resulting precipitate may then be admixed with a binder and stirred into a uniform piece which can be shaped into any form desired, such as strands. The resulting strands are autoclaved with steam to give rise to the final product.

Kjelson, U.S. Pat. No. 3,343,963, patented Sept. 26, 1967 teaches formation of high protein food products resembling chopped ground meats. A source of spun edible protein fibers is bound together with a binder consisting of albumen, gluten and particular oilseed material. The composition is heat-set to form the simulated meat product.

Hartman, U.S. Pat. No. 3,320,070, patented May 16, 1967, has taught formation of bacon-like products from man made fibers of natural vegetable protein with a binder including albumen, and edible proteins. The bacon-like product is formulated with lean and non-lean portions so as to simulate real bacon.

More recently, Leidy et al., in U.S. Pat. Nos. 3,711,291; 3,713,837; 3,719,498; and British Pat. No. 921,756 have taught various methods of making sausage analogs from a heat settable "gel precursor".

Other U.S. Patents of interest are: Hai et al., U.S. Pat. No. 3,719,499; Leidy et al., U.S. Pat. No. 3,840,677; and Yang et al., U.S. Pat. No. 3,814,823.

While these prior art attempts may in a generic sense simulate sausage and other meat products, no known process has been developed which will allow the production of meat analogs which have the appearance as well as the chewiness, biting properties, juiciness, mouth lubrication, cohesion and frying properties of real meat products. The present invention is concerned with alleviating these shortcomings of the prior art.

SUMMARY OF THE INVENTION

It is, therefore, an object of the present invention to provide a sausage analog of sausage-like chewiness, biting properties, juiciness, mouth lubrication, cohesion and frying properties.

Another object of this invention is to provide a method of producing a sausage analog having properties of real sausage.

Still a further object of the present invention is to produce meat-like products from proteinaceous raw materials.

A still further object of this invention is to provide a processed sausage analog having a high protein content and a low fat content.

The objects of this invention are accomplished by a process for the production of a sausage analog resembling the natural product in appearance, cooking characteristics, flavor, eating qualities and texture, said process comprising:

a. Providing an aqueous mixture of flavors, spices, and coloring agents;

b. Forming a first phase by continuously mixing vital wheat gluten, water and salt into a dough, cooling the dough to form a cohesive, elastic mass, thereafter extruding the cohesive mass to obtain strands of hydrated gluten;

c. Forming a second phase by mixing textured protein with the flavoring solution, and thereafter chopping the second phase to the desired size;

d. Providing a third phase of an edible fibrous material;

e. Forming a fourth phase by blending egg white, non-fat dry milk, sodium caseinate and dextrose with fat which has been heated to a temperature in the range of 160°–250° F.;

f. Providing a fifth phase comprising fat having a melting point in the range of 80° F. to 110° F.;

g. Cooling all of the phases to a temperature between 40°–60° F. while maintaining each phase in separate containers; and h. Thereafter, thoroughly mixing all of the phases together. The objects of this invention can also be accomplished by a process for the production of a sausage analog resembling the natural product in appearance, cooking characteristics, flavor, eating qualitites and texture, said process comprising:

a. providing an aqueous mixture of from 5–15 percent by weight flavors, from 2–4 percent by weight spices, and from 0.1–0.3 percent by weight coloring agents;

b. forming a first phase by continuously mixing from 25–45 percent by weight vital wheat gluten, 55–75 percent by weight water and 0–2 percent by weight salt into a dough, cooling the dough to form a cohesive, elastic mass, thereafter extruding the cohesive mass to obtain strands of hydrated gluten;

c. forming a second phase by mixing one part by weight textured protein concentrate with from 1–4 parts by weight of the aqueous mixture, and thereafter cutting the second phase to a desired size, said textured protein being selected from the group consisting of soy protein isolate, soy protein concentrate, soy flour, peanut protein, sesame seed protein, oat protein, collagen, gelatin, egg albumen, milk proteins, non-fat dry milk, and lactalbumin;

d. providing a third phase of an edible protein fiber;

e. forming a fourth phase by blending from 12–25 parts by weight egg white, from 7–10 parts by weight non-fat dry milk, from 0–4 parts by weight sodium caseinate and from 2–5 parts by weight dextrose with from 20–40 parts by weight fat which has been heated to a temperature in the range of 180°–220° F., thereafter, forming a gelatinous mass by adding from 20–40 parts by weight of the aqueous mixture which is at a temperature in the range of from 170° to 212° F., f. forming a fifth phase by blending one part by weight fat which is at a temperature in the range of 180°–220° F., with from 1–3 parts by weight of the aqueous mixture;

g. adjusting each phase to a temperature in the range of from 40°–60° F.; and h. thereafter, thoroughly mixing all of the phases together, and forming patties or links.

The objects of this invention can also be accomplished by a simulated sausage product, comprising: vital wheat gluten in an amount from 0–20 percent by weight; textured protein concentrate in an amount from 4–16 percent by weight; egg white in an amount from 3–10 percent by weight; non-fat dry milk in an amount from 0–4 percent by weight; sodium caseinate in an amount from 0–4 percent by weight; dextrose in an amount from 0–2 percent by weight; fat in an amount from 10–40 percent by weight; flavors in an amount from 2–10 percent by weight; spices in an amount from 0.1–6 percent by weight; salt in an amount from 0–1 percent by weight; coloring agents in an amount from 0.05–0.15 percent by weight; and water in an amount from 30–60 percent by weight.

The present invention can also be practiced by a process wherein the fifth phase is formed by blending a liquefied fat with a portion of the flavor solution, thereby forming an emulsion. When this is done a portion of the fat-water emulsion will flow out of the analog during cooking to provide frying properties similar to those attained when cooking or frying real meat. When the fifth phase consists only of a liquefied fat, the frying properties, although still desirable, are less like the frying properties of real meat.

In essence, the process consists of developing individual phases that are responsible for chewiness, biting properties, juiciness, mouth lubrication, cohesion, and frying properties. These phases are then mixed in a designed fashion so that the phases maintain their integrity. The most critical part of the process is a balance between the solid, semi-solid and liquid components so as to obtain the desired consistency of an uncooked sausage. This is accomplished by physical entrapment or physicochemical binding of a major part of the liquids (water and fat) to provide the desired consistency and texture, and by leaving a minor part of the fat and water free to flow out during cooking to provide desirable frying properties. In other words the desired consistency of an uncooked sausage is accomplished by forming continuous and discontinuous fat and water phases.

In the practice of the present invention the protein material can be animal protein or plant protein or a combination of animal protein and plant protein. Plant proteins found useful in the present process may be derived from any source, for example, soy beans, cottonseeds, wheat, peanuts, and corn. Mixtures of plant proteins may be used also, and such mixtures have been found to result in excellent products. Animal proteins found useful in the present process may be derived from any source, for example, egg albumen, milk proteins, collagen, non-fat dry milk, and lactalbumin.

The present invention can be employed to make products resembling a wide variety of meat products.

The novel features of the invention, both as to the product and method of making such product, together with the further objectives and advantages thereof, will be better understood from the following description in which a presently preferred method of the invention is illustrated.

DETAILED DESCRIPTION OF THE INVENTION

The process employed to form the simulated sausage product requires the development of five individual and distinct phases. Each of these five phases is designed to simulate a certain desired characteristic of real sausage. The preferred product has phases simulating the following characteristics of real sausage: (1) chewiness; (2) biting properties; (3) cohesiveness; (4) frying properties; and (5) fibrous properties. The simulated sausage product is produced by forming and mixing together the separately formed phases. All of the phases are cooled to a temperature of 40°–60° F. before they are mixed together. Any conventional mixing means can be employed. For good frying properties, it is desirable to add the continuous fat or fat and water phase at the end of the mixing step. Fat-soluble flavors may be added near the end of the mixing step. During mixing, care is taken not to mix violently so as to prevent fat melting due to high shear. The mixture of all of the phases is then cooled to a temperature in the range of 40°–60° F. and formed into patties or links. Alternatively, patties or links may be formed from the phase mixture and allowed to cool to the desired firmness and consistency.

The patties or links of sausage may be stored refrigerated or frozen. The finished product is similar to sausage prior to frying, fries in a manner similar to sausage, and upon frying, is analogous to fried sausage in appearance, chewiness, juiciness, cohesiveness and eating qualities. Alternatively, the product may be fried, then stored.

The first step in the preparation of the sausage analog of this invention is the formation of an aqueous mixture of flavors, spices and coloring agents, hereinafter referred to as a flavor solution. The flavor solution is prepared by mixing flavors, spices, and coloring agents with water in a mixer or blender. On the basis of final product weight the following flavor solution composition may be used:

| | |
|---|---|
| Pork sausage flavor | 2.0–4.0% |
| Pork roast flavor | 0–2% |
| Ground or flaked black pepper | 0.1–0.3% |
| Ground white pepper | 0.1–0.2% |
| Ground red pepper | 0.02–0.04% |
| Sage | 0.1–0.3% |
| Coloring agents | 0.0–2% |
| Water | 40–65% |

The next step in the preparation of the sausage analog is the formation of the phase which provides the chewy characteristic of real sausage, hereafter referred to as Phase 1. In preparing Phase 1, a dough is formed and under continuous mixing salt is added to the dough, thereafter the dough is cooled to form a cohesive, elastic mass. The dough is then extruded to obtain strands of hydrated gluten.

The term "dough" is used herein to connote a dough which is prepared by mixing and kneading ingredients comprising water and gluten or a gluten containing material such as wheat flour, rye flour or other flours having dough forming properties. The dough which we use in the preparation of Phase 1 is a conventional type of dough similar to that used in ordinary baking. As aforesaid, the dough can be prepared from substantially pure gluten or from any type of flour containing gluten having dough forming properties. We prefer to use vital wheat gluten although any flour of similar dough forming properties can also be used. Preparation of the dough is conventional and can be performed in standard bakery equipment. The term "vital wheat gluten" is used to describe forms of concentrated dried wheat gluten which have been subjected to a minimum of heat denaturation during drying and which, consequently, possesses on reconstitution with water, at least to some degree, the wet state extensible properties of freshly prepared wet wheat gluten. The proportions of flour or gluten and water are not critical and are within the skill of the art since the proportion of gluten and water can be adjusted to give a dough of any desired consistency depending on the type of product to be made. With vital wheat gluten, I have found that about 10 parts by weight of gluten to about 14 and 16 parts by weight of water gives a highly satisfactory dough. With other types of gluten or flour more or less water may be used according to the nature of the gluten. the dough can also contain other ingredients such as protein, salt or other flavoring ingredients. The amount of salt incorporated into the dough affects its toughness. The more salt that is used, the tougher the finished product will be. Accordingly, when very little salt is used, the finished product is much softer.

The main contribution of the dough is its contribution to the formation of a product which has the chewiness of meat. A further contribution lies in the improvement of the appearance of the finished product because streaks and particles of dough in the product provide the non-uniform appearance which characterizes many meats and meat products.

The proportions of dough to be used in accordance with the invention are fairly well defined because if too much dough is present, the resultant product will be too chewy. On the other hand, when the concentration of dough is too low, the product falls apart when it is chewed and lacks the chewy characteristic of meat. I have found in accordance with these considerations that the amount of dough should be from about 10 to about 25 percent by weight of the final product.

The next step in the preparation of the sausage analog is the formation of the phase which provides the juiciness and bite resistant characteristics of real sausage, hereafter referred to as Phase 2. In preparing Phase 2, a texturized protein is mixed with a portion of the flavor solution. The textured protein is first hydrated and thereafter cut or chopped to the desired size if necessary. It is preferred that the hydrated pieces of textured protein be chopped to a size of less than ¼ inch cubes. The textured protein can be any plant protein that is texturized. Preferably, the protein material is an oilseed, solvent extracted, plant protein such as soy protein isolate, soy flour or soy protein concentrate. Other oilseed vegetable proteins, solvent extracted to concentrate the protein therein are also highly acceptable, such as peanut and sesame seed protein and the other oilseed vegetable proteins. It is preferred that the protein material contain at least about 25 percent by weight protein. With textured soy protein concentrate, I have found that about 2 parts by weight of textured soy protein concentrate to about 5 parts by weight of the flavor solution gives a highly satisfactory result.

The next step in the preparation of the sausage analog is the formation of a fibrous phase, consisting of protein fiber, to simulate the structure and texture of real sausage meat, hereafter referred to as Phase 3. The preferred protein fiber for use in this invention is structured soy protein isolate. It is also preferable that the length of the protein fiber be between ⅛" and 1", that the protein content of the fiber be about 30–35 percent, and the protein fiber be adjusted to room temperature before combining it with the other phases.

The next step in the practice of the present invention is the formation of a binding or cohesive phase, hereinafter referred to as Phase 4. Phase 4 is formed by blending a portion of the flavor solution with fat, egg white, non-fat dry milk, sodium caseinate and dextrose. The fat is heated to a temperature in the range of 180° to 250° F. and blended with the dry ingredients. Thereafter, the flavor solution heated to a temperature in the range of 170° to 212° F. is added to form a gelatinous mass. I have found 20–35 p.b.w. fat, 15–25 p.b.w. egg white, 7–10 p.b.w. non-fat dry milk, 3–4 p.b.w. sodium caseinate, 2–4 p.b.w. dextrose and 30–40 p.b.w. of the flavor solution gives a highly satisfactory fourth phase.

The egg white used in this phase provides cohesion to the entire product. By using hot fat and hot flavor solution, part of the egg white is denatured or gelled to that the fat and water are encased in a protein (egg white) film, thus forming a discontinuous or bound fat and water phase. During the frying process, this bound fat and water phase stays in the product providing juiciness and mouth-lubricating properties. The undenatured part of the egg white acts as a binder for all particulate material such as textured protein and wheat gluten. Non-fat dry milk and dextrose act as the browning agents so that the surface of the final product browns in a manner similar to that of real sausage. Sodium caseinate is used to provide elasticity or rubberiness to the final product which characterizes real sausage.

The next step in the preparation of the sausage analog of this invention is the formation of the continuous fat and water phase which provides frying properties similar to real sausage. This phase will hereafter be referred to as Phase 5. To prepare Phase 5, a fat is heated to a temperature above its melting point and thereafter mixed with a portion of the flavor solution. It is preferable to use a fat which has a melting point between 80° and 110° F. The preferred ratio of fat to the flavor solution is 1:1.

The fat and flavor solution used in this phase provides the continuous or free fat-water phase in the product. This free fat and water phase migrates to the surface of the product carrying with it some of the soluble solids such as non-fat dry milk and dextrose. Thus this emulsion phase provides lubricity, at the surface of the product, so that the product fries in a manner similar to real sausage. Addition of oil to the pan prior to frying is therefore not necessary.

The following examples are offered to illustrate but not limit the process of this invention. Unless stated to the contrary, all percentages are given by weight.

EXAMPLE 1

Phase 1—Preparation of Chewy Phase

Five hundred grams of vital wheat gluten is weighed into a mixing bowl. Seven hundred milliliters of tap water at ambient temperature is added to the gluten and the contents are mixed to form a dough. With continuous mixing, 15 grams of salt is added to the dough and the dough is cooled to form a cohesive, elastic mass. The dough is then extruded using a Kitchen Aid mixer with a grinder attachment to obtain strands of hydrated gluten. For a 1,000 gm. product, 170 gms. of hydrated gluten is used.

Flavors and Spices

All of the flavors, color, and spices are weighed and blended with 350 milliliters of water. For example, the following components are weighed and mixed with water:

| Flavor — | Pork sausage flavor | 40 grams |
|---|---|---|
| Spices — | Ground black pepper | 2.5 grams |
| | Ground white pepper | 1.7 grams |
| | Ground red pepper | 0.3 grams |
| | Salt | 5.0 grams |
| | Sage | 2.0 grams |
| Color — | Caramel color | 0.8 grams |
| | Red dye | 0.03 grams |

Phase 2—Juicy Phase With Bite Resistance

Eighty grams of textured soy protein concentrate is mixed with 200 grams of the flavor solution. The textured protein concentrate may either be hydrated by heating the mix to a boil and allowing hydration for 2-5 minutes or by allowing hydration at ambient temperature for 15-30 minutes. The hydrated pieces are chopped to the desired size of less than ¼" cubes.

Phase 3—Fibrous Phase For Structure

Fifty grams structured soy protein isolate with fiber length of ⅛"-1" and a protein content of 30-35% is weighed and brought to room temperature.

Phase 4—Phase Providing Cohesiveness

The following ingredients are weighed:

| | |
|---|---|
| Fat (M.P. 90°–100° F.) | 100.0 grams |
| Egg white | 43.4 grams |
| Non-Fat Dry Milk | 20.0 grams |
| Sodium Caseinate | 10.0 grams |
| Dextrose | 10.0 grams |

The fat is heated in an oven to 180°–220° F. and blended with the dry ingredients in a blender. While mixing, 100 grams of the flavors and spices solution previously heated to 170°–212° F. is added to form a gelatinous mass.

Phase 5—Continuous Fat and Water Phase for Frying Properties Similar to Real Sausage Fifty grams of fat (Melting Point 90°–110° F.) is heated to 180°–220° F. and mixed in a blender with the remaining flavor and spices solution.

Mixing and Forming

All the phases are cooled to a temperature of 40°–60° F. and mixed in a mixing bowl. For good frying properties, it is desirable to add the continuous fat and water phase (Phase 5) in the end. During mixing, care is taken not to mix violently so as to prevent fat-melting due to high-shear. The mix is allowed to cool in the refrigerator for at least 30 minutes and formed into patties or links. Alternatively, patties or links may be formed and allowed to cool to desired firmness and consistency.

The patties or links may be stored refrigerated or frozen. The product is similar to sausage prior to frying, fries in a manner similar to sausage and upon frying, is analogous to fried sausage in appearance, chewiness, juiciness, cohesiveness and eating qualities. Alternatively, the product may be fried and then stored.

EXAMPLE 2

To form a product that resembles a sausage product the following ingredients were used:

| Ingredients | Parts-By-Weight |
|---|---|
| Vital wheat gluten | 8.0 |
| Textured soy protein concentrate | 8.72 |
| Egg white solids | 4.85 |
| Non-fat dry milk | 1.94 |
| Sodium caseinate | 0.97 |
| Dextrose | 0.97 |
| Vegetable fat | 16.50 |
| Pork sausage flavor | 5.80 |
| Spices | 0.55 |
| Color | 0.08 |
| Salt | 0.30 |
| Water | 51.32 |

The wheat gluten was mixed with 12 pbw of water and 0.3 pbw of salt to form a dough. It was extruded at room temperature into ¼" strands. The strands were cut with rotating knife to obtain approximately ¼" spheres of gluten, hereafter referred to as Phase 1.

The remaining water was mixed with the flavors, spices and coloring agent in a high speed mixer to produce the flavor solution, hereafter referred to as the flavor phase.

Twenty-eight parts by weight of the flavor solution was heated in a steam-jacketed tank to boil and the textured protein concentrate was added to the tank. The mixture was stirred to insure uniform hydration of the protein concentrate. Hydration was allowed to continue for 10 minutes. The resulting textured protein is hereafter referred to as Phase 2.

Ten parts by weight of the vegetable fat was melted and heated to 200° F. in a tank. In a separate container, egg white solids, non-fat dry milk, sodium caseinate and dextrose were mixed as a dry mix. The dry mix was added to the heated fat with continuous stirring to avoid lump formation. To this, the remaining flavor solution heated to 180°-200° F. in a separate tank was added to obtain a gelatinous mass. This mixture is hereafter referred to as Phase 3.

All the phases were then cooled to 55° F. and mixed together. Sixty-five pounds of solid fat left-over after the formation of other phases was then added with continuous mixing action.

Although a fibrous phase of protein fiber was not added, the product at this point appeared similar to uncooked sausage. It was formed into patties using a continuous pattie-former. The patties can be stored in a freezer or refrigerator and fried in a manner similar to real sausage.

EXAMPLE 3

The process is similar to that in Example 2 except that the final product was stuffed into sausage casing, tied every 3 or 4 inches with a thin string, heated in a boiling water bath or steam-bath for 2-4 minutes and cooled to obtain sausage-link analog.

EXAMPLE 4

Same as Example 2 except that part of the textured protein concentrate was replaced with structured protein fiber.

EXAMPLE 5

Same as Example 2 except that no sodium caseinate was used.

EXAMPLE 6

Same as Example 2 except that sodium caseinate was replaced with gelatin.

Having now fully described and disclosed this new invention, what is claimed and sought to be secured by Letters Patent of the United States is:

1. A process for the production of a sausage analog resembling the natural product in appearance, cooking characteristics, flavor, eating qualities and texture, said process comprising:
   a. providing an aqueous mixture of flavors, spices, and coloring agents;
   b. forming a first phase by continuously mixing vital wheat gluten, water and salt into a dough, thereafter extruding the dough to obtain strands of hydrated gluten;
   c. forming a second phase by mixing one part by weight textured protein concentrate with from 1-4 parts by weight of the aqueous mixture, and thereafter cutting the second phase to a desired size;
   d. providing a third phase of an edible protein fiber;
   e. forming a fourth phase by blending from 12-25 parts by weight egg white, from 7-10 parts by weight non-fat dry milk, from 3-4 parts by weight sodium caseinate and from 2-4 parts by weight dextrose with from 20-35 parts by weight fat which has been heated to a temperature in the range of 180°-220° F., thereafter, forming a gelatinous mass by adding from 30-40 parts by weight of the aqueous mixture which is at a temperature in the range of from 170° to 212° F.;
   f. forming a fifth phase by blending one part by weight fat which is at a temperature in the range of 180°-220° F., with from 1-3 parts by weight of the aqueous mixture;
   g. adjusting each phase to a temperature in the range of from 40°-60° F.; and
   h. thereafter, thoroughly mixing all of the phases together, and forming patties or links, wherein, the amount of dough of the first phase is from about 10 to about 25 percent by weight of the final product.

2. A process as recited in claim 1, wherein the aqueous mixture comprises from 5-15 percent by weight flavors, 2-4 percent by weight spices, and from 0.1-0.3 percent by weight coloring agents.

3. A process as recited in claim 1 wherein the first phase comprises from 25-45 precent by weight vital wheat gluten, 55-75 percent by weight water, and 0-2 percent by weight salt.

4. A process as recited in claim 3, wherein the second phase comprises a ratio of 20-35 percent by weight textured protein to 65-80 percent by weight of the aqueous mixture.

5. A process as recited in claim 4, wherein the textured protein of the second phase is a protein selected from the group consisting of soy protein isolate, soy protein concentrate, soy flour, peanut protein, sesame seed protein, and oat protein.

6. A process as recited in claim 5, wherein the edible protein fiber of the third phase is a member selected from the group of structured soy protein fiber, spun soy protein, or other edible protein fibers.

7. A process as recited in claim 1, wherein the fourth phase comprises from 15-25 percent by weight egg white, from 7-10 percent by weight non-fat dry milk, from 0-4 percent by weight sodium caseinate, from 2-5 percent by weight dextrose, from 20-40 percent by weight fat, and from 20-40 percent by weight of aqueous flavor solution.

8. A process as recited in claim 7, wherein from 5-15 percent by weight of the aqueous mixture is mixed with from 10-20 percent by weight of the first phase, from 25-40 percent by weight of the second phase, from 3-10 percent by weight of the third phase, and from 15-30 percent by weight of the fourth phase.

9. A process as in claim 8 wherein the fifth phase comprises a fat having a melting point in the range of 80°-110° F.

10. A process as recited in claim 9, wherein the textured protein is an animal protein selected from the group consisting of collagen, gelatin, egg albumen, milk proteins, non-fat dry milk, and lactalbumin.

11. A process as recited in claim 1, wherein the fifth phase is formed by blending a liquefied fat with a portion of the flavor solution, thereby forming an emulsion.

* * * * *